US007633462B2

United States Patent
Ahn et al.

(10) Patent No.: US 7,633,462 B2
(45) Date of Patent: Dec. 15, 2009

(54) DIFFRACTION GRATING AND LASER TELEVISION USING THE SAME

(75) Inventors: Pil-Soo Ahn, Suwon-si (KR); Serafimovi Pavel, Yongin-si (KR); Byoung-Ho Cheong, Goyang-si (KR); Yong-Kweun Mun, Yongin-si (KR); Jin-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1162 days.

(21) Appl. No.: 11/096,776

(22) Filed: Apr. 1, 2005

(65) Prior Publication Data
US 2005/0219700 A1  Oct. 6, 2005

(30) Foreign Application Priority Data
Apr. 1, 2004  (KR) .................. 10-2004-0022530

(51) Int. Cl.
*G09G 3/00* (2006.01)
*G02B 5/18* (2006.01)
(52) U.S. Cl. .................. 345/32; 359/566; 359/569; 359/574; 348/291; 348/E9.026
(58) Field of Classification Search .......... 345/22–26, 345/32; 359/566, 569, 574–576; 348/291, 348/E9.026
See application file for complete search history.

(56) References Cited

U.S. PATENT DOCUMENTS

| 5,362,957 A | * | 11/1994 | Nakai et al. ............... 250/208.1 |
| 5,502,707 A | * | 3/1996 | Komma et al. .......... 369/112.07 |
| 6,084,710 A | * | 7/2000 | Katsuma ..................... 359/569 |
| 6,798,575 B2 | * | 9/2004 | Kobayashi .................. 359/618 |

* cited by examiner

Primary Examiner—Bipin Shalwala
Assistant Examiner—Steven E Holton
(74) Attorney, Agent, or Firm—The Farrell Law Firm, LLP

(57) ABSTRACT

A diffraction grating including a substrate, and a grating member formed on the substrate, the grating member having a stepped structure including steps, the number of which corresponds to an odd number greater than or equal to three to provide an odd phase structure. The heights of the steps of the grating member are determined such that the light beams diffracted by their corresponding steps substantially have a phase difference of $\pi$ with reference to a diffracted light beam of a reference wavelength.

8 Claims, 3 Drawing Sheets

DIFFRACTION GRATING AND LASER TELEVISION USING THE SAME

PRIORITY

This application claims priority to an application entitled "DIFFRACTION GRATING AND LASER TELEVISION USING THE SAME" filed in the Korean Intellectual Property Office on Apr. 1, 2004 and assigned Serial No. 2004-22530, the contents of which are hereby incorporated by reference.

BACKGROUND OF THE INVENTION

1. Field of the Invention

The present invention relates to a diffraction grating, and more particularly to a diffraction grating having a structure to control a sparkling phenomenon occurring in an image-reproducing apparatus due to a laser source.

2. Description of the Related Art

Generally, image-reproducing apparatuses such as projection televisions (TVs) and laser TVs, in order to produce various colors on a screen, use lasers capable of producing light beams of different wavelengths, with corresponding colors, such as red, green and blue. Color images are produced by combining the above-mentioned light beams of different wavelengths, and displaying them on a screen.

Laser beams produce light beams of different wavelengths and thus, different colors, which correspond to their respective wavelength. However, these light beams have a high coherency, so that an irregular intensity distribution is exhibited when the light beams reproduce an image on a display or screen. This irregular intensity distribution exhibited on the display or screen, due to the high coherency of the light beams, is called "sparkle noise."

Such sparkle noise may be produced as a result of many factors, such as surface non-uniformity of the display or screen (on which an image is displayed by the light beams), and/or fine dust present in optical paths (along which the laser beams travel), and other factors.

Various means and methods have been proposed to attenuate or entirely abate this sparkle noise. For example, the use of ground glass plates has been proposed. In this case, the generation of sparkle noise on a display or screen is reduced by arranging the ground glass plates in the respective optical paths of different laser beams, and vibrating the ground glass plates. However, there is a problem in that the different light beams exhibit a loss of intensity after passing through the ground glass plates. Alternatively, as diffraction gratings are known to exhibit a high transmissivity with respect to the above-mentioned coherent light beams, as compared to ground glass plates, their use has also been proposed as a sparkle-noise-attenuating means. Diffraction gratings have an advantage in that they can reduce the intensity loss of the coherent light beams.

However, diffraction gratings for reducing or removing sparkle noise have the disadvantage of requiring a plurality of diffraction gratings, each having different grating periods corresponding to the respective wavelengths of the coherent light beams, which increases complexity and manufacturing costs and requires complex optical axis alignment due to use of a plurality of diffraction gratings.

SUMMARY OF THE INVENTION

Therefore, the present invention has been made in view of the above mentioned problems incurred in the related art, and an object of the invention is to provide a diffraction grating to prevent generation of sparkle noise in a laser TV adapted to reproduce an image on a screen by light beams of different wavelengths.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Now, preferred embodiments of the present invention will be described in detail with reference to the annexed drawings. In the following description of the present invention, a detailed description of known functions and configurations incorporated herein will be omitted when it may make the subject matter of the present invention unclear.

Figure 1:
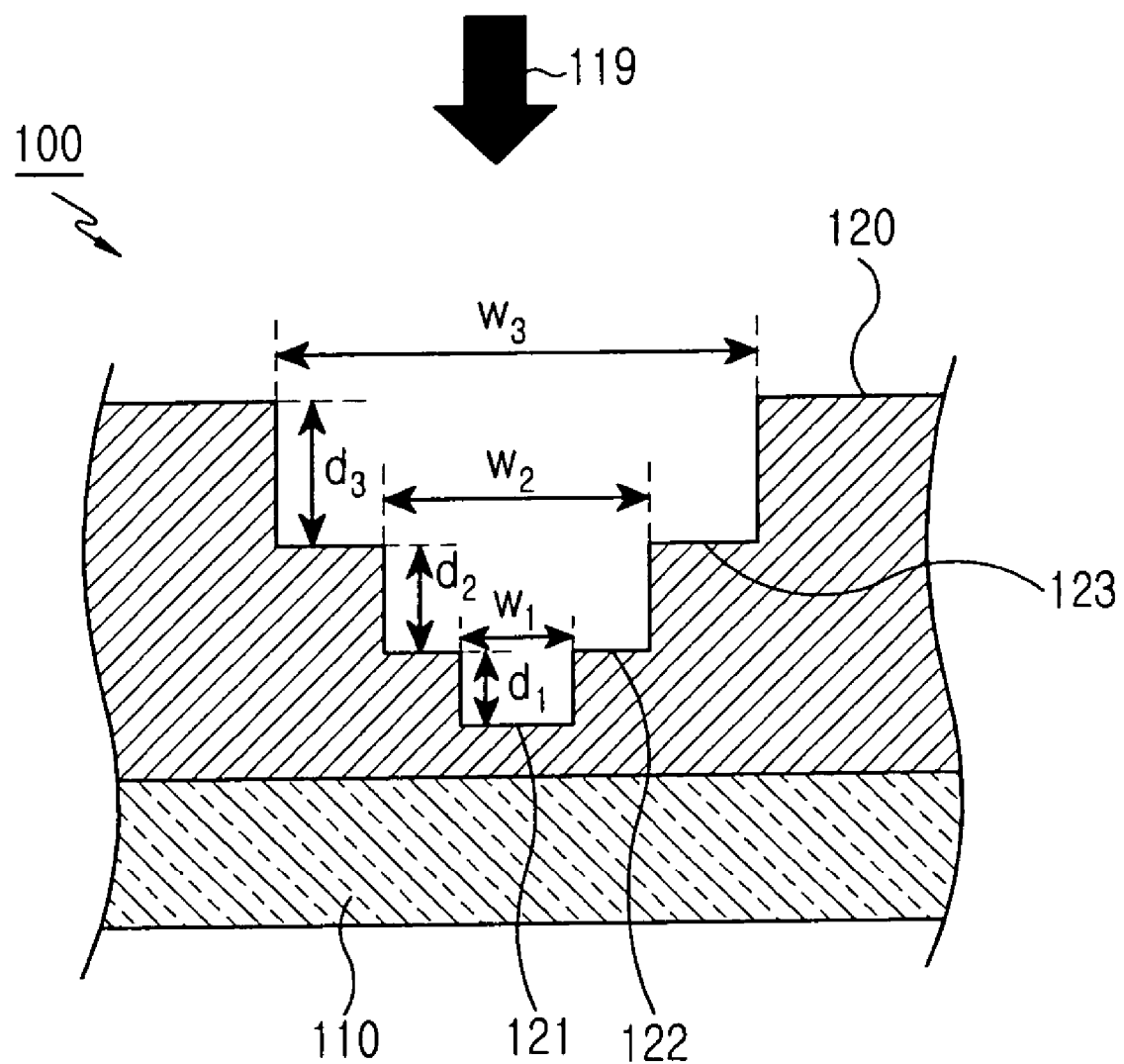
FIG. 1 is a cross-sectional view to explain a structure of a diffraction grating according to a first embodiment of the present invention.

FIG. 1 is a cross-sectional view to explain a structure of a diffraction grating according to a first embodiment of the present invention. The diffraction grating 100 includes a substrate 110, and a grating member 120 formed on the substrate 110 having a stepped structure. The arrow 119 indicates the direction of incidence of light beams upon the diffraction grating 100. The grating member 120 preferably has a plurality of steps 121, 122, and 123. The number of steps in the grating member 120 can be an odd number corresponding to 3 or more to provide an odd phase structure as will be described below. Each of the steps 121, 122, and 123 has a height determined such that the zero-order diffraction pattern of the light beam to be diffracted by the associated step substantially has a phase difference of $\pi$ from the zero-order diffraction pattern of a light beam of a reference wavelength. Respective widths W1, W2, and W3 of the steps 121, 122, and 123, respectively can be determined based on the respective wavelengths of light beams which are to be diffracted by the steps 121, 122, and 123. The relation between the respective wavelengths of light beams incident to the steps 121, 122, and 123 and the respective widths W1, W2, and W3 of the steps 121, 122, and 123 can be expressed by Equation 1 shown below.

$$W = \frac{m\lambda}{\sin\theta} \quad \text{Equation 1}$$

where, "W" represents the width of one step in the grating member, "θ" represents the diffraction angle of the light diffracted by the step, "m" represents diffraction order and "λ" represents the wavelength of the light diffracted by the step.

Thus, the widths W1, W2, and W3 of the steps 121, 122, and 123 in the grating member 120 can be determined, based on the respective wavelengths λ of the associated light beams to be diffracted, as expressed in Equation 1, above.

Figure 3:
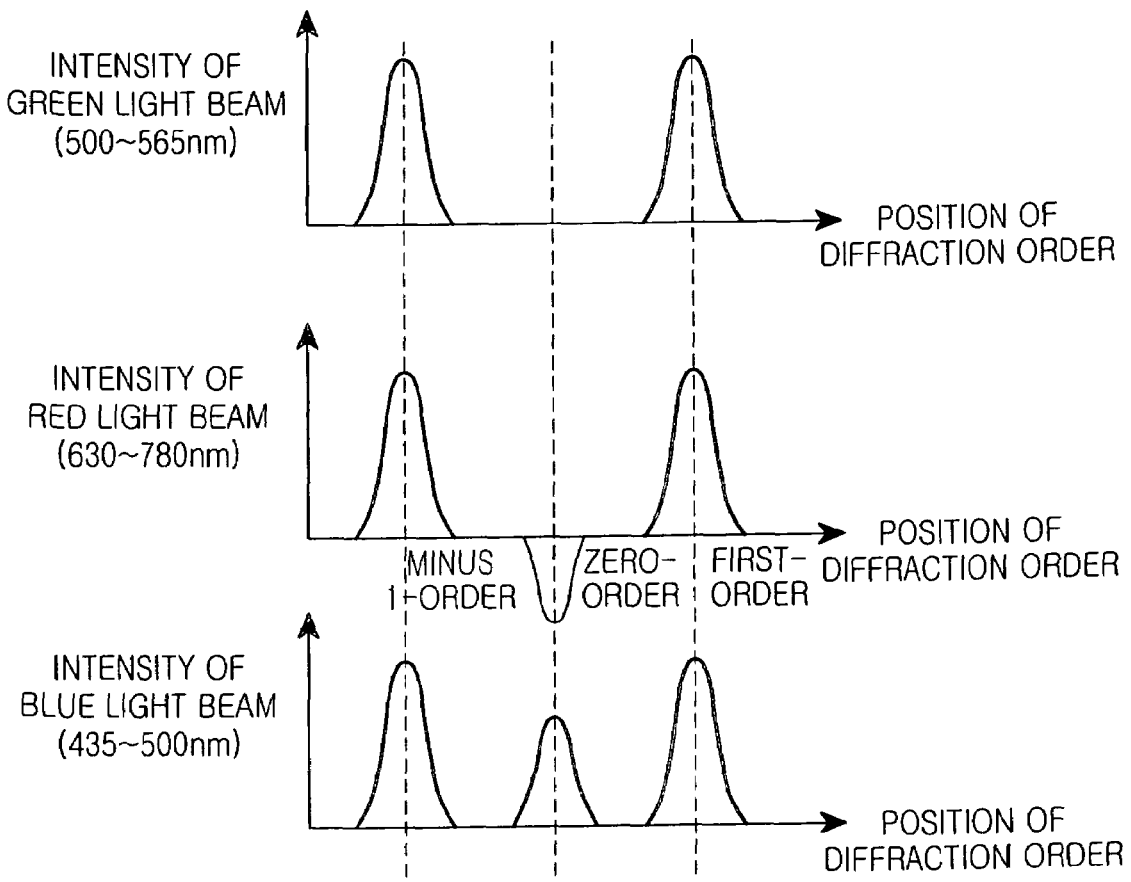
FIG. 3 is a graph for explaining operation of the diffraction grating shown in FIGS. 1 and 2.

FIG. 3 is a graph depicting respective spectrum distributions of light beams having different wavelengths, and respective positions of diffraction patterns of different orders in diffracted light beams respectively produced from the light beams by a diffraction grating. Hereinafter, suppression of sparkle noise using phase differences in the diffraction grating according to an embodiment of the present invention will be described in detail with reference to FIG. 3. Generally, laser TVs use red, green and blue light beams to produce an image on a screen. The green light beam has a wavelength range of 500 to 565 nm, the red light beam has a wavelength range of 630 to 780 nm, and the blue light beam has a wavelength range of 435 to 500 nm.

An irregular phase variation of the zero-order diffraction pattern of the light beam diffracted from each of the red, green and blue light beams may cause spatial sparkle noise. In order to prevent such an irregular phase variation, the heights of the steps 121, 122, and 123 (as shown in FIG. 1) are set such that the zero-order diffraction patterns of the red and blue light beams have a phase difference of $\pi$ with reference to the green light beam. Thus, the generation of sparkle noise caused by spatial coherence of the light beams is suppressed.

Where the distance between the image reproduced on the screen by the light beams and the diffraction grating is constant, reproduction of constant diffraction patterns on the screen is possible. That is, where it is assumed that the wavelength of the green light beam is a reference wavelength, the heights of the steps 121, 122, and 123 are set such that the red and blue light beams have a phase difference of $\pi$ with reference to the green light beam. Thus, it is possible to minimize the generation of sparkle noise caused by spatial coherence of input light beams by configuring the grating member 120 such that the steps 121, 122, and 123 have a phase difference of $\pi$ from one another.

In order to make the zero-order diffraction patterns of the blue and red light beams have a phase difference of $\pi$, the heights of the steps 121, 122, and 123 are set based on Equations 2 or 3, (shown below) such that the blue and red light beams have a phase difference of $\pi$ from the green light beam.

$$d_g = \frac{\lambda_g}{2(n-1)} \qquad \text{Equation 2}$$

where "n" represents the refractive index of the grating member 120, and "$d_g$" represents the physical height of a selected one of the steps 121, 122, and 123 to diffract a light beam into a phase of $\lambda/2$ ($\pi$) by the selected step when the light beam has a wavelength of $\lambda_g$.

$$d_g = \frac{\lambda}{n-1} \qquad \text{Equation 3}$$

where "n" represents the refractive index of the grating member 120, and "$d_g$" represents the physical height of a selected one of the steps 121, 122, and 123, respectively to diffract a light beam into a phase of $\lambda(2\pi)$ by the selected step when the light beam has a wavelength of $\lambda_g$.

That is, it is possible to minimize the generation of sparkle noise caused by spatial coherence of the light beams by setting the heights of the steps 121, 122, and/or 123, (with the exclusion of the step that diffracts the green light beam) such that the red and blue light beams which are diffracted by their corresponding steps have a phase difference of $\pi$ with reference to the step which diffracts the green light beam.

Figure 2:
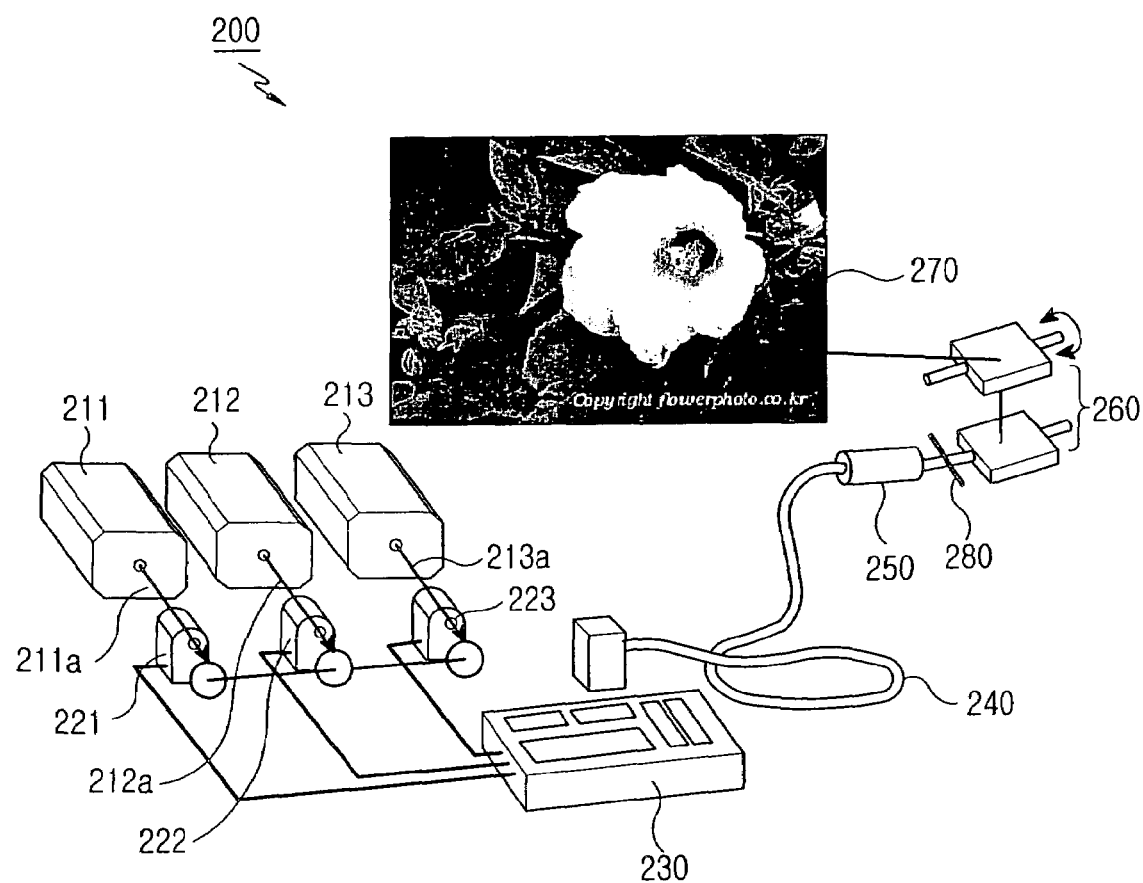
FIG. 2 is a schematic perspective view illustrating a laser TV according to a second embodiment of the present invention, which includes the diffraction grating according to the first embodiment of the present invention.

FIG. 2 is a schematic perspective view illustration of a laser TV according to a second embodiment of the present invention. The laser TV includes a diffraction grating according to the first embodiment of the present invention. The laser TV includes a plurality of lasers 211, 212, and 213 which generate coherent light beams (211A, 212A and 213A, respectively) having different wavelengths, a scanner 260 to reproduce a color image on a screen, based on the coherent light beams, and a diffraction grating 280 arranged between the lasers 211, 212, and 213 and the scanner 260. The laser TV also includes modulators 221, 222, and 223 to modulate the light beams of different wavelengths outputted from the lasers 211, 212, and 213, respectively, a controller 230 to control the modulators 221, 222, and 223, and a lens system 250 to guide the light beams 211A, 212A, and 213A so that they are incident upon the scanner 260.

The first laser 211 outputs the green light beam 211A having a wavelength range of 500 to 565 nm. The second laser 212 outputs a red light beam 212A having a wavelength range of 630 to 780 nm. The third laser 213 outputs a blue light beam 213A having a wavelength range of 435 to 500 nm. The first, second and third light beams 211A, 212A and 213A have coherence properties.

As in the first embodiment of the present invention, the diffraction grating 280 includes a substrate (not shown), and a grating member (not shown) formed on the substrate. The grating member has a stepped structure including a plurality of steps, the number of which is an odd number equal to or greater than three, so as to provide an odd phase structure. As described above, the diffraction grating 280 is arranged between the lasers 211, 212 and 213 and the scanner 260. Each of the steps in the grating member has a height determined such that the light beams diffracted by their corresponding steps substantially have a phase difference of $\pi$ with reference to a diffracted light beam of a reference wavelength. Accordingly, the generation of spatial sparkle noise caused by the spatial coherence of the first, second and third light beams 211A, 212A and 213A is suppressed. Also, it is possible to remove sparkle noise by applying vibration of a desired frequency and amplitude to the diffraction grating 280.

As is apparent from the above description, the present invention provides a single diffraction grating including a grating member having a plurality of steps so that the light beams diffracted by the associated steps substantially have a phase difference of $\pi$ from the light beam of a reference wavelength, with a phase difference of $\pi$ to remove sparkle nose of coherent light beams having different wavelengths. Accordingly, there is an advantage in that sparkle noise of multiple light beams having different wavelengths can be minimized or entirely removed. As a result, it is possible to achieve an improvement in productivity and throughput.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A diffraction grating for diffracting light beams comprising:
    a substrate; and
    a grating member formed on the substrate, the grating member having a stepped structure including steps, the number of steps being an odd number equal to or greater than three so as to provide an odd phase structure, wherein the height of the steps of the grating member is determined such that the light beams diffracted by their corresponding steps substantially have a phase difference of $\pi$ with reference to a diffracted light beam of a reference wavelength.

2. The diffraction grating of claim 1, wherein each of the steps has a width which is dependent upon a wavelength of a light beam to be diffracted by the step.

3. A laser television comprising:

a plurality of lasers to generate coherent light beams having a plurality of wavelengths;

a scanner to produce, from the respective coherent light beams, images comprising various colors on a screen; and a diffraction grating arranged between the lasers and the scanner, the diffracting grating including a substrate, and a grating member formed on the substrate, the grating member having a stepped structure including steps, the number of which equals an odd number equal to or greater than three so as to provide an odd phase structure, wherein the height of the steps of the grating member is determined such that the light beams diffracted by their corresponding steps substantially have a phase difference of $\pi$ with reference to a diffracted light beam of a reference wavelength.

4. The laser television of claim 3, further comprising:

a plurality of modulators to modulate the light beams of different wavelengths outputted from the lasers;

a controller to control the modulators; and a lens system to guide the light beams of different wavelengths modulated by the modulators to be incident to the scanner.

5. The laser television of claim 3, wherein the lasers comprise a first laser to output a green light beam having a wavelength of 500 to 565 nm.

6. The laser television of claim 3, wherein the lasers comprise a second laser to output a red light beam having a wavelength of 630 to 780 nm.

7. The laser television of claim 3, wherein the lasers comprise a third laser to output a blue light beam having a wavelength of 435 to 500 nm.

8. The laser television of claim 3, wherein the light beams are coherent light beams having high coherence properties.

* * * * *